April 24, 1945.   W. A. MELSOM   2,374,225
FLEXIBLE HOSE COUPLING
Filed May 8, 1942
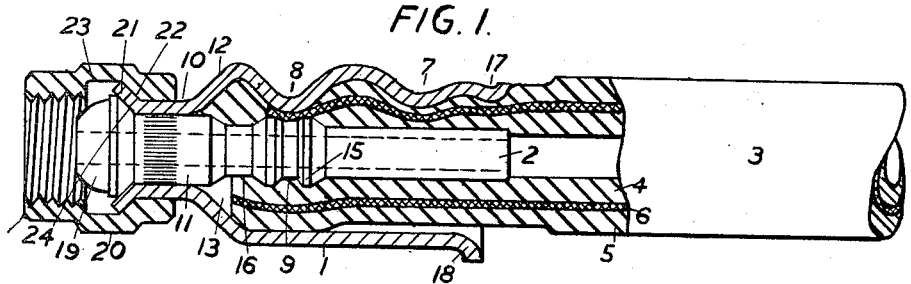
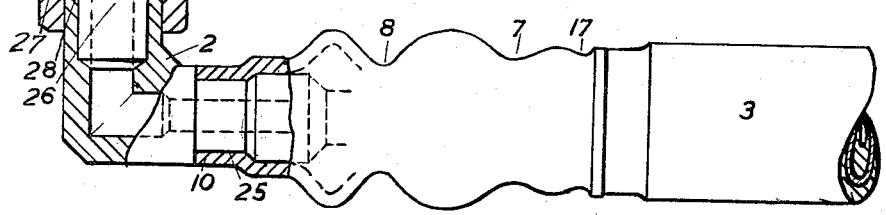
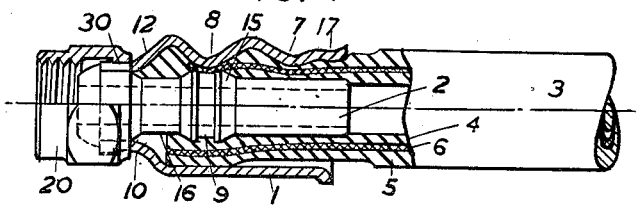
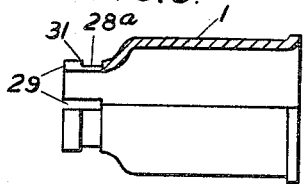
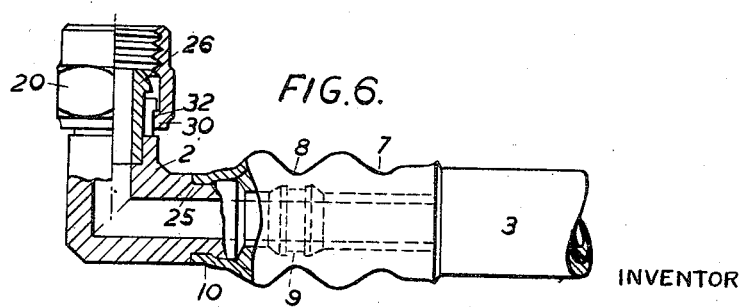
INVENTOR
Walter Arthur Melsom
BY Albert F. Nathan
ATTORNEY Patented Apr. 24, 1945

2,374,225

UNITED STATES PATENT OFFICE 2,374,225

FLEXIBLE HOSE COUPLING

Walter Arthur Melsom, London, England, assignor to Bowden (Engineers) Limited, London, England, a British company Application May 8, 1942, Serial No. 442,207
In Great Britain October 4, 1941

13 Claims. (Cl. 285—84)

The present invention relates to improvements in flexible hose coupling components of the kind comprising a flexible hose having tubular layers of resilient material, such as rubber in various forms, natural or synthetic, reinforced by one or more tubular layers of reinforcing material between such layers of resilient material, an inner rigid tubular insert and a circumferentially continuous metallic sleeve which is made of a material suited to contraction such as brass, aluminium alloy, low carbon steel, or phosphor bronze, and is contracted to clamp the hose onto the insert (which may be of the same material as the sleeve), and which are suitable, and more particularly intended for use with medium and high pressure hose (i. e., hose suitable for pressures of 500 lbs. per sq. inch and upwards) such as are employed for the hydraulic or pneumatic transmission of power or for the conveyance of gases, liquids, semi-solids or viscous substances under pressure where it is of great importance that neither the sleeve nor the insert shall blow off the hose, nor the anchoring stresses prove too sever for the hose material.

With couplings of this kind it is necessary to seal the hose to the insert sufficiently tightly to prevent the escape of any fluid, and also to grip the hose between sleeve and insert with sufficient force to prevent any risk of its being blown off axially by the internal fluid pressure, and the contracting pressure which must be exercised for the latter purpose usually exceeds that which is necessary to produce a fluid tight seal, and may be so great that there is a danger of rupturing or unduly straining the rubber walls of the hose, and this danger is increased when the rubber or other resilient material is of low elasticity, e. g., the so called "short" rubber or certain rubber substitutes which are coming into use under war necessity.

With the object of obviating this difficulty the present invention is characterised by the formation of a separate clamping zone situated between the sealing zone and the end of the hose where the sleeve is so powerfully contracted as to displace sideways the rubber or like material of the inner and outer layers in such zone so as to bare the reinforcing layer on its opposite sides and produce a powerful grip of the bared portion, provision being made for the escape of the rubber so displaced from such bared zone.

Generally the bared reinforcement will be gripped by direct contact with the sleeve and the insert, but we do not exclude cases where one or more separate elements take part in the grip, provided that such elements do not substantially weaken the grip of the hose upon the insert. For example, a ring of metal fibre may be interposed between the sleeve and the hose and become axially locked with the sleeve as a result of the contracting operation.

The main reason for breakdown of the coupling, under the considerable fluid pressure within the hose, has been as stated above the insufficiency of the grip on the insert, of the rubber or like material sandwiched between the reinforcing material and the insert and since in accordance with this invention the reinforcement is held securely against displacement bodily, and offers great resistance to elongation when the hose is sealed by the sleeve on the insert, the hose end will remain securely gripped between the sleeve and insert, with higher internal pressures than have hitherto been generally possible, or, alternatively, the contracting pressure at the sealing zone can be reduced, and this is particularly advantageous when the "short" rubbers are used in making the hose.

The insert may be peripherally grooved and a portion of the bared reinforcing material pressed by the sleeve into the groove, or alternatively the bared reinforcement may be closed in around a rib or shoulder on the insert.

It is essential for the purposes of this invention that the material displaced from the bared zone should be able to escape in either direction. The material escaping towards or beyond the end of the hose, i. e., to the left in Fig. 1, may be retained within the coupling component, in which case the sleeve should be so formed and dimensioned before contraction, and the contraction be so carried out, that a space is left between the sleeve and insert or other parts of the coupling to receive the displaced material.

The escape in the other direction, i. e., in the right of Fig. 1 takes place by displacement of the hose material and the provision of a suitable space between the surface of the hose and the sleeve will facilitate this escape and also serve for the reception of any hose material displaced towards the clamping zone by the contraction at the sealing zone.

According to the main and preferred form of the invention I leave the hose, where the reinforcement is to be bared, of the same thickness before the swaging operation as the remainder of the hose within the sleeve. I may, however, according to a modified method diminish the amount of hose material to be displaced by removing part of such material before the swaging operation, e. g., a ring of material may be removed from the outer resilient layer, and this ring may extend down to the reinforcement, or in the case of hose of larger size it may be possible to remove a portion or the whole of the inner layer, or a combination of these methods may be employed, and the remaining material is subsequently displaced by swaging. I would however, have it understood that I do not claim the method of making a component (or components made according to such method), in which both surfaces of the reinforcement are bared by so removing the hose material, leaving none to be displaced by swaging, such method (and components made according to it) forming the subject of our co-pending application Serial No. 438,464.

Whilst in the forms of the invention herein specifically described the bared zone in which the reinforcement is directly gripped between sleeve and insert extends to the end or substantially to the end of the reinforcement, I do not exclude forms in which it does not so extend.

The invention is applicable to forms of hose wherein the reinforcement is of a composite nature, e. g., a layer of braided metal with an adjacent layer or layers of fabric.

The reinforcements generally found in medium and high pressure hose are of braided structure, and may be either of metal or textile material. I have found that a reinforcement consisting of a layer or layers of braided metal, e. g., groups of high tensile steel wires braided to tubular form enclosed between two fabric layers (which may be either braided or woven) gives very good results when used for the purpose of my invention.

In cases where the hose has a plurality of reinforcing layers separated by rubber or like material, the latter may also be forced out by the contraction of the sleeve so that the reinforcing layers are brought together and gripped onto the insert in the same manner as with a single layer, and in order that there shall be no doubt that the claims include these forms in the scope thereof as well as forms in which there are only two resilient layers separated by an intervening reinforcing layer, each resilient intermediate layer should be regarded as an outer layer and the reference to baring both sides of the reinforcing material should be regarded as meaning baring both sides of each layer of reinforcing material.

Alternatively part of one or more of the layers of reinforcing material and part of the resilient material may be removed, leaving intact the other layer or layers of reinforcing material which is or are gripped when the remaining portion of the resilient material in the clamping zone is displaced by the contraction.

A further zone of contraction where the maximum constriction is less than that of the sealing zone may be provided to check the escape of rubber, space being preferably provided as shown in the accompanying drawing between this zone of lesser constriction and the sealing zone to receive the rubber displaced towards it.

I may complete the contraction at the clamping zone prior to contracting at the sealing zone or the two contractions may be effected in one operation, the contraction starting first at the clamping zone, e. g., by spinning or by causing radially closing dies first to contract the sleeve where the braiding is to be bared before the dies reach the sleeve at the sealing zone and then to complete the contractions simultaneously.

A sleeve of uniform wall thickness serves well for the purposes of this invention.

It is to be understood that when herein I speak of contraction of the sleeve I mean such a contraction as will produce a permanent deformation thereof.

In order that the invention may be more readily understood reference is made to the accompanying drawing in which:

Fig. 1 is a longitudinal sectional elevation in which the lower half of the view shows the parts ready for contraction and the upper half shows the form of the parts after contraction and Fig. 2 is a view of the sleeve in its original form. Fig. 3 is a longitudinal elevation partly in section of a modified coupling component with an angled insert. Fig. 4 is a longitudinal elevation showing a modified connection between the insert and the nut used for coupling the component and Fig. 5 is a view, half in section, of the sleeve used in this form. Fig. 6 is a longitudinal elevation of a form similar to that shown in Fig. 4 but modified for use with an angled insert.

The hose coupling component shown comprises a bottle-shaped sleeve 1, an insert 2 and a flexible hose 3 which has inner and outer tubular layers 4, 5 of rubber or like material and an intervening reinforcing layer 6 e. g., of wire braiding which may have inner and outer layers of woven fabric. The sleeve is as usual radially contracted at the zone 7 to force the hose onto the insert with a pressure sufficient to seal the hose and insert against leakage, and for this purpose, the contraction of the sleeve must be limited to ensure that the rubber layers, or at any rate the inner layer 4, are or is not ruptured or punctured. However, such grip of the hose on the insert may be sufficient to prevent relative axial displacement between the hose and the insert under fluid pressure within the hose and therefore I radially contract the sleeve at zone 8 with such a heavy pressure that the rubber of both the inner and outer layers flows sufficiently to bare the braiding 6 and this is gripped powerfully and directly between the sleeve and the insert.

The insert has a continuous peripheral or annular groove 9 within the zone of contraction 8 and the bared braiding is forced into this groove and axially locked with the insert. The groove may be interrupted circumferentially so as also to lock the braiding against rotation relatively to the insert, or the braiding may be forced down over a continuous or interrupted peripheral rib or ribs. The direct grip of the braiding is usually sufficient to prevent such relative rotation.

The neck 10 of the sleeve is engaged by the thickened portion 11 of the insert and therefore the shoulder 12 of the sleeve closes that end of the annulus which contains the hose end. A cavity 13 is present between the hose and the end wall 12 when the contraction commences and a further cavity is left between the zones 7 and 8 formed in the example illustrated by the clearance between the wall of the outer tube and the sleeve before the latter is contracted. The hose is shown expanded by a collar portion 15 in which the groove 9 is formed. The groove 16 formed between the collar 15 and the enlarged portion 11, forms part of the cavity 13.

Where it is desired to further check the escape of the rubber past the end of the insert which projects into the hose a further zone of contraction 17 may be produced between the end of the insert which projects into the hose and the sealing zone 7 preferably approximately around the end of the insert; the maximum constriction at this zone 17 being less than the maximum at the zone 7.

The contraction of the zone 8 may be carried out before the contraction of the sealing zone is commenced or completed. Alternatively the contraction of the zones 7, 8 may take place in one operation, the contraction at the clamping zone being commenced before the contraction at the sealing zone and where one or more further pressure zones 17 are produced all of the pressure zones may be produced in one operation. I prefer to use radially moving dies for producing the different pressure zones but other means may serve, such as spinning or a like process.

The main part of the sleeve may be a cylinder of uniform wall thickness as shown or it may be a cylinder with local external annular enlargements at one or more of each pressure zone. The dies may be suitably profiled or stepped in order to produce a greater contracting pressure where the metal reinforcement is to be bared than at the zone 7 or zone 17.

Alternatively, if suitable enlargements are provided, co-linear dies or a convergent die may serve, the external diameters of the enlargements being in the former case so chosen that the dies first commence to contract the enlargement around the part of the hose to be bared, whereafter the dies then commence to contract the sealing zone 7 and then that 17 and finally the contractions proceed simultaneously.

The inner end of the sleeve may be flared at 18, e. g., by spinning or otherwise upsetting, or it may merely be radiused.

The sleeve may be made from sheet or tube, with the aid of press tools, or it may be made by machining from the solid bar or tube. The insert may be machined from the bar. The sleeve and insert may in some cases be made in one piece, but I generally prefer to make them in separate pieces.

The enlarged projecting portion of the insert may make a good fit in the neck of the bottle shaped sleeve and in some cases may be axially, or both axially and circumferentially, interlocked therewith, e. g., by radially contracting the neck into or around a profiled part of the insert as described and claimed in my prior Patent No. 450,491, but the forms of couplings herein illustrated are designed inter alia to avoid this operation. A space for the escape of the displaced rubber may however be left between the end of the sleeve and the insert.

In the form shown in Fig. 1 the insert has a conical or spherical or like male sealing end 19 for engagement with the female counterpart on the part to which the coupling component is to be joined. The insert however may be the female part if desired or it may be externally screwed to form a male union.

The neck of the sleeve is inserted into the nut 20 used for making the junction between the sealing end 19 and its counterpart and a conical lip 21 is set up with the aid of a suitable tool at the end of the neck, this lip engaging behind a conical shoulder 22 formed by one wall of a groove 23 in the nut. The insert is then inserted through the sleeve neck with a good fit and it has a conical portion 24 to seat against the interior conical surface of the lip so that when the nut is screwed up the lip on the sleeve is securely clamped between the nut and the insert and is held against both axial and radial movement. Moreover the strength of the insert at this part is also considerably enhanced by the sleeve shrouding it.

When applying this mode of retaining the nut to elbow or other angle junctions as shown in Fig. 3 I prefer as shown to avoid using an elbow or angle sleeve but to use an elbow or angle insert and to join the sleeve strongly thereto by swaging a portion of the neck of the sleeve into a groove 25 in the insert, or around a rib or projection thereon, and this insert may be arranged to receive a separate nipple 26 which is to make sealing contact with the companion coupling component. In this case the insert is expanded at its outer end to form a retaining lip 27, the lip engaging behind shoulder 22 of the nut and the sealing nipple having a conical portion 28 to clamp the lip 27 between it and the nut when the latter is screwed up, and thus form a sealed joint between the sealing nipple and the insert.

Alternatively (see Figs. 4 and 5) the neck of the sleeve may have an external groove 28a and a plurality, e. g., four axial slots 29 cut along it to its outer end to enable it to be deformed sufficiently to pass through the aperture provided by the shoulder 30 in the nut. A tool is then inserted to expand the closed-in end portion behind the nut shoulder 30 which then intrudes into the groove in the neck and thus locks the nut against withdrawal from the end of the sleeve without interfering with the freedom of the nut to rotate. The side wall 31 of the groove 28a forms a thrust face when the nut is being screwed up. The neck need not be slotted but may be of a size that will pass through the nut and when passed through the nut the neck is expanded into the nut groove with the aid of a tool such as a drift, tube expander or the like.

These latter forms of nut-mounting are also applicable to elbow or other angle junctions (see Fig. 6) for the insert and the sleeve neck can be interlocked by swaging the sleeve into the groove 25 in the insert and the insert instead of the sleeve, provided with a groove 32 the portion of the insert end beyond the groove 32 being expanded behind the shoulder 30 in the nut and a separate sealing nipple 26 being inserted into such end of the insert and being sealed to the insert by the act of screwing-up the nut. The end of the insert may be axially slotted if desired so as to require to be closed in before it can pass through the nut aperture.

The nut may be rotatably mounted on the insert in other ways, e. g., by the usual method of sliding the nut over the insert from the inner end thereof to bring a shoulder on the nut against a thrust wall on the insert, or by the methods according to my prior patents, Nos. 540,489 and 540,490.

What I claim is:

1. The method of producing a hose coupling component for use with medium or high pressure flexible hose, such component having an end portion of a flexible hose, which comprises at least two tubular layers of rubber or like resilient material and at least one intermediate layer of flexible reinforcing material, which consists in contracting a circumferentially continuous sleeve around the hose and a rigid insert, at one zone to seal the hose fluid-tightly against the insert and at a separate zone between the sealing zone and the end of the hose to produce a clamping zone by displacing sideways the resilient material of the inner and outer layers in such zone sufficiently to bare both sides of the reinforcing material and produce a powerful clamp of the sleeve and insert on the bared portion, provision being made for the escape of the rubber so displaced from the bared zone.

2. The method of producing a hose coupling component for use with medium or high pressure flexible hose, such component having an end portion of a flexible hose, which comprises at least two tubular layers of rubber or like resilient material and at least one intermediate layer of flexible reinforcing material, which consists in contracting a circumferentially continuous sleeve member around the hose and a rigid insert member, at one zone to seal the hose fluid-tightly against the insert and at a separate zone between the sealing zone and the end of the hose to produce a clamping zone by displacing sideways the resilient material of the hose in such zone with the aid of a part separate from the sleeve and insert members sufficiently to bare both sides of the reinforcing material and produce a powerful clamp of the bared portion in direct engagement with said separate part on the one side and with one of said members on the other, provision being made for the escape of the rubber so displaced from the bared zone.

3. The method of producing a hose coupling component for use with medium or high pressure flexible hose which comprises inner and outer tubular layers of rubber or like resilient material and an intermediate layer of flexible reinforcing material, which consists in contracting a circumferentially continuous sleeve around the hose and a rigid insert having an annular locking wall, at one zone to seal the inner layer of the hose fluid-tightly against the insert and at a separate zone between the sealing zone and the end of the hose to produce a clamping zone by displacing sideways the resilient material of the inner and outer layers in such clamping zone sufficiently to bare both sides of the reinforcing material and clamp the bared portion in direct engagement with the insert behind said annular locking wall thereon, provision being made for the escape of the rubber so displaced from the bared zone.

4. The method of producing a hose coupling component for use with medium or high pressure flexible hose which comprises at least two tubular layers of rubber or like resilient material and at least one intermediate layer of flexible material which consists in inserting the hose between a circumferentially continuous sleeve and a rigid insert having an annular enlargement provided with an annular groove and expanding an end portion of the hose over said annular enlargement and contracting said sleeve around the hose and insert, at one zone to seal the inner resilient layer fluid tightly against the insert and at a separate zone between the sealing zone and the end of the hose and around said enlargement to produce a clamping zone by displacing sideways the resilient material of the inner and outer layers in such zone sufficiently to bare both sides of the reinforcing material and force the bared portion into said annular groove and powerfully clamp it in direct engagement with the insert, and allowing for escape of the rubber so displaced from the bared zone.

5. The method of producing a hose coupling component for use with medium or high pressure flexible hose which comprises at least two tubular layers of rubber or like resilient material and at least one intermediate layer of flexible reinforcing material, which consists in contracting a circumferentially continuous sleeve around the hose and a rigid insert, in one operation to produce a zone of constriction by displacing resilient material of the hose sideways sufficiently to seal the inner resilient layer of the hose fluid-tightly on the insert and a separate clamping zone of greater constriction by displacing sideways the resilient material of the inner and outer layers of the hose in such zone sufficiently to bare both sides of the reinforcing material and clamp it directly on the insert, space being left sufficient to receive the resilient material of the hose displaced towards the end of the hose from said clamping zone and space being left between the zones sufficient to receive substantially the whole of the resilient material of the hose displaced from each zone towards the other.

6. The method of producing a hose coupling component for use with medium or high pressure flexible hose which comprises at least two tubular layers of rubber or like resilient material and at least one intermediate layer of flexible reinforcing material, which consists in contracting a circumferentially continuous sleeve around the hose and a rigid insert to produce a clamping zone by displacing sideways the resilient material of the inner and outer layers of the hose sufficiently to bare both sides of the reinforcing material in such zone and clamp it directly on the insert, space being left sufficient to receive the resilient material of the hose displaced towards the end of the hose from said clamping zone, then contracting the sleeve to produce a sealing zone by displacing sideways only so much of the hose material as to seal the hose fluid-tightly on the insert, space being left between the sealing and clamping zones sufficient to receive substantially the whole of the resilient material displaced from said sealing zone towards the end of the hose.

7. The method of producing a hose coupling component for use with medium or high pressure flexible hose which comprises at least two tubular layers of rubber or like resilient material and at least one intermediate layer of flexible reinforcing material, which consists in contracting a circumferentially continuous sleeve around the hose and a rigid insert to produce at least two zones of constriction by displacing the resilient material of the hose sideways sufficiently to seal the inner resilient layer fluid-tightly on the insert and to provide in addition a clamping zone by displacing sideways the resilient material of the inner and outer layers sufficiently to bare both sides of the reinforcing material in such zone and produce a powerful clamp of the sleeve and insert on the bared portion, spaces being left for the reception of displaced material between adjacent zones and beyond the clamping zone.

8. The method of producing a hose coupling component for use with medium or high pressure flexible hose which comprises at least two tubular layers of rubber or like resilient material and at least one intermediate layer of flexible reinforcing material, which consists in contracting a circumferentially continuous sleeve around the hose and a rigid insert to produce at least two zones of constriction by displacing sideways the resilient material of the hose in said zones sufficiently to seal the inner resilient layer of the hose on the insert, one of said zones nearer the end of the insert which projects into the hose being of lesser constriction than the other zone or zones, and to produce beyond the said zones in the direction of the adjacent end of the hose a clamping zone by displacing the resilient material of the inner and outer layers of the hose sufficiently to bare both sides of the reinforcing material in such zone and cause the sleeve and insert to grip the opposite sides of the bared portion, provision being made for the reception of the displaced material.

9. A hose coupling component suitable for use with medium and high pressure hose comprising a circumferentially continuous sleeve, a rigid insert and a flexible hose, said hose comprising at least two tubular layers of rubber or like resilient material and at least one intermediate layer of flexible reinforcing material, said sleeve being contracted on to a portion of the hose to produce a zone of constriction between the sleeve and insert and to seal the hose fluid-tightly with the insert and being also contracted so powerfully at a separate clamping zone between the sealing zone and the end of the hose as to displace the resilient material of the hose in the clamping zone sufficiently to bare the reinforcing material on its opposite sides and produce a powerful clamp of the sleeve and insert on the bared portion.

10. A hose coupling component suitable for use with medium and high pressure hose comprising a circumferentially continuous sleeve and a rigid insert forming an annular chamber and a flexible hose, said hose comprising at least two tubular layers of rubber or like resilient material and intermediate flexible tubular reinforcing material, said sleeve being contracted on to a portion of the hose to seal the hose with the insert and forming at least two zones of constriction and being also contracted at a separate zone beyond the said zones of constriction in the direction of the adjacent end of the hose so as to produce a clamp of the sleeve and the insert on at least one layer of reinforcing material which is bare on its opposite sides of the resilient material, a quantity of the rubber or like material being disposed between the end of the reinforcing material and the end wall of the chamber, that one of said first two zones which is nearer to the end of the insert which projects into the hose providing a constriction between the sleeve and the insert which is less than that produced at the other of said zones.

11. A hose coupling component suitable for use with medium and high pressure hose comprising a circumferentially continuous sleeve member, a rigid insert member, at least one separate clamping member and a flexible hose, said hose comprising at least two tubular layers of rubber or like resilient material and at least one intermediate layer of flexible reinforcing material, said sleeve being contracted on to a portion of the hose to produce a constriction between the sleeve and insert and seal the hose fluid-tightly to the insert and being also so powerfully contracted at a separate clamping zone between the sealing zone and the end of the hose as to displace the rubber or like material of the hose sideways sufficiently to bare the reinforcing material in such zone on its opposite sides and clamp said bared portion directly between two of said members.

12. A hose coupling component suitable for use with medium and high pressure hose comprising a circumferentially continuous sleeve, a rigid insert provided with an external enlargement having an annular groove forming a shoulder, and a flexible hose, said hose comprising inner and outer tubular layers of rubber or like resilient material and an intermediate layer of flexible reinforcing material, said sleeve being contracted on to a portion of the hose to produce a zone of constriction between the sleeve and insert thereby to seal the hose fluid-tightly to the insert and being also so powerfully contracted at a separate clamping zone situate opposite said external enlargement between said zone of constriction and the end of the hose as to displace the resilient material of the hose in said clamping zone sideways sufficiently to bare the reinforcing material in such zone on its opposite sides and force the bared portion into the said groove and around the shoulder on the insert into direct engagement with the insert so that it is clamped directly by the sleeve and insert.

13. The method of producing a hose coupling component for use with medium or high pressure hose, such component having an end portion of a flexible hose, which comprises at least two tubular layers of rubber or like resilient material and at least one intermediate layer of flexible reinforcing material, which consists in contracting a circumferentially continuous sleeve around the hose and a rigid insert and effecting the contraction at one zone to seal the hose fluid-tightly against the insert and at a separate zone between the sealing zone and the end of the hose to clamp the reinforcing material, and which further consists in removing a part of the hose material prior to contracting the sleeve at the zone where said clamping action is to be produced to leave at least one reinforcing layer and part of the resilient material in said zone and in displacing sideways the remaining resilient material at such zone by said contraction of the sleeve sufficiently to bare both sides of the reinforcing material and produce a powerful clamp of the sleeve and insert on the bared portion, provision being made for the escape of the rubber so displaced from the bared zone.

WALTER ARTHUR MELSOM.